(12) United States Patent
Browne et al.

(10) Patent No.: US 7,284,786 B2
(45) Date of Patent: Oct. 23, 2007

(54) PANELS HAVING ACTIVE MATERIAL BASED FOLD LINES

(75) Inventors: Alan L. Browne, Grosse Pointe, MI (US); Nilesh D. Mankame, Ann Arbor, MI (US); Nancy L. Johnson, Northville, MI (US); Andrew C. Keefe, Encino, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/357,925

(22) Filed: Feb. 17, 2006

(65) Prior Publication Data

US 2006/0186700 A1 Aug. 24, 2006

Related U.S. Application Data

(60) Provisional application No. 60/654,310, filed on Feb. 19, 2005.

(51) Int. Cl.
*B62D 29/00* (2006.01)

(52) U.S. Cl. .............. 296/181.1; 296/191; 296/107.01; 296/97.22; 296/193.07; 296/97.8; 296/37.8

(58) Field of Classification Search ............. 296/181.1, 296/191, 107.01, 97.22, 193.07, 97.8, 37.8
See application file for complete search history.

(56) References Cited

U.S. PATENT DOCUMENTS 6,072,154 A * 6/2000 Maynard .................... 219/209
6,175,989 B1 * 1/2001 Carpenter et al. ............ 16/225
6,772,479 B2 * 8/2004 Hinkley et al. ............... 16/225
6,979,050 B2 * 12/2005 Browne et al. .......... 296/180.5
7,118,652 B2 * 10/2006 Mc Knight et al. ...... 296/180.5
2004/0197519 A1 * 10/2004 Elzey et al. .................. 428/68
2005/0199845 A1 * 9/2005 Jones et al. ............ 251/129.06
2007/0090667 A1 * 4/2007 Yang et al. .................. 296/191

FOREIGN PATENT DOCUMENTS

JP        2000345444 A    * 12/2000

* cited by examiner

*Primary Examiner*—Jason S Morrow

(57) ABSTRACT

A panel having active material based segments, wherein the segments define a hinge location that can be selectively stiffened or folded on demand. The active material based segments include an active material such that activation of the active material by an activation device can allow folding of the panel, can effect self-folding of the panel, or can serve to lock the panel into a fixed position when not activated. In this manner, the panel that can be variously stiffened or folded on demand. Other embodiments include forming the panel of the active material such that the panel can be compacted and stowed upon activation of the active material to change the modulus properties thereof.

16 Claims, 2 Drawing Sheets

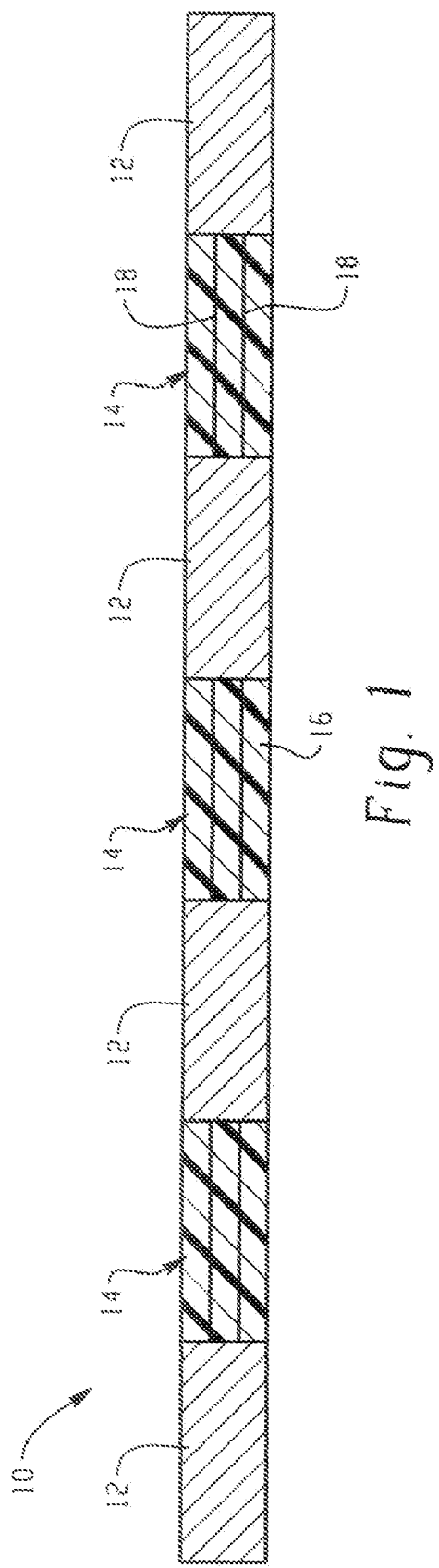
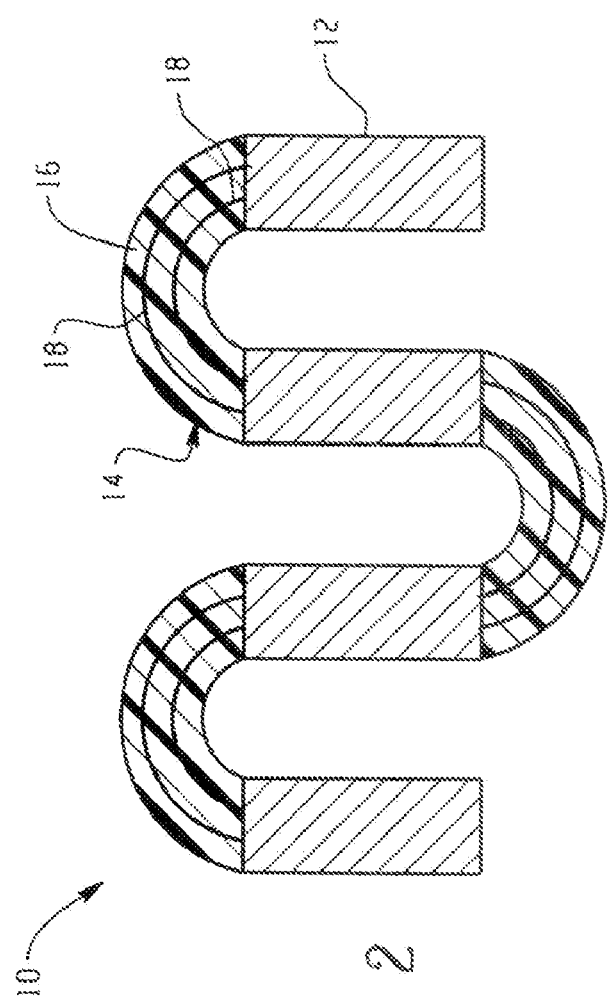

PANELS HAVING ACTIVE MATERIAL BASED FOLD LINES

CROSS REFERENCE TO RELATED APPLICATIONS

The present application claims the benefit of Provisional Application No. 60/654,310 filed on Feb. 19, 2005, incorporated herein by reference in its entirety.

BACKGROUND

The present disclosure generally relates to panels having active material based fold lines, wherein the fold lines can be selectively stiffened and/or folded on demand.

BRIEF SUMMARY

Disclosed herein are foldable panels and methods of use. In one embodiment, the panel comprises alternating segments of a rigid non-active material and an active material, wherein the alternating linear segments define a hinge at about a region of the active material; an activation device in operative communication with the active material, wherein the activation device is adapted to provide an activation signal, wherein the shape and/or modulus properties of the active material change in response to the activation signal; and a controller in operative communication with the activation device.

In another embodiment, a panel comprises a segment of shape memory polymer; and an activation device in operative communication with the shape memory polymer, wherein the activation device is adapted to provide an activation signal to the shape memory polymer and selectively change a modulus property of the shape memory polymer, wherein the change in the modulus property increases flexibility of the segment.

A method for selectively compacting a panel comprises activating an active material defining at least a portion of the panel, wherein activating the active material changes a modulus property of the active material; compacting the panel at hinge points defined by a location of the active material; and deactivating the active material to restore the modulus property of the active material.

The above described and other features are exemplified by the following figures and detailed description.

BRIEF DESCRIPTION OF THE DRAWINGS

Referring now to the figures, which are exemplary embodiments and wherein like elements are numbered alike:

FIG. 1 is a cross-section of a roof panel in a fully extended configuration in accordance with one embodiment of the disclosure; and FIG. 2 is a cross-section of the roof panel of FIG. 1 in a collapsed configuration.

DETAILED DESCRIPTION

Figure 3:
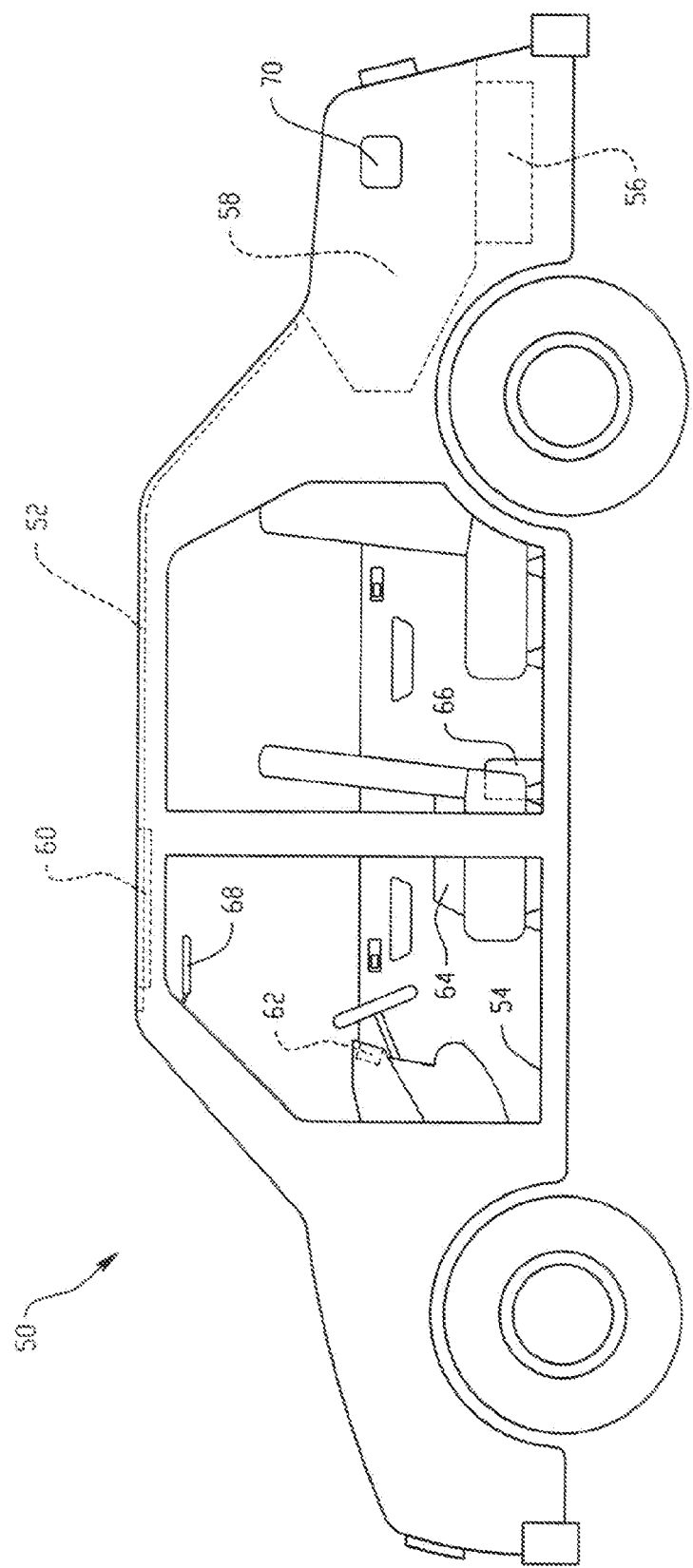
FIG. 3 illustrates a vehicle having reconfigurable panels with active material based fold lines.

This disclosure is generally directed to panels having active material based fold lines, wherein the fold lines can be selectively stiffened or softened and the panel subsequently folded on demand. The portions of the panel that define the fold lines are formed of the active material such that activation of the active material by an activation device can soften the fold lines. Subsequent activation of an actuator, either active material based or conventional can then effect folding of the panel. Deactivation of the active material fold line can serve to lock the panel into a fixed position. In this manner, the panel can be variously stiffened or softened and subsequently folded on demand.

The term "active material" as used herein refers to several different classes of materials, all of which exhibit a change in at least one attribute such as dimension, shape, and/or flexural modulus when subjected to at least one of many different types of applied activation signals, examples of such signals being thermal, electrical, magnetic, mechanical, pneumatic, and the like. One class of active materials is shape memory materials. These materials exhibit a shape memory effect. Specifically, after being deformed pseudoplastically, they can be restored to their original shape in response to the activation signal. Suitable shape memory materials include, without limitation, shape memory alloys (SMA), ferromagnetic SMAs, and shape memory polymers (SMP). A second class of active materials can be considered as those that exhibit a change in at least one attribute when subjected to an applied activation signal but revert back to their original state upon removal of the applied activation signal. Active materials in this category include, but are not limited to, electroactive polymers (EAP), magnetorheological fluids and elastomers (MR), electrorheological fluids (ER), baroplastics, composites of one or more of the foregoing materials with non-active materials, combinations comprising at least one of the foregoing materials, and the like.

The active material is in operative communication with an activation device. The activation device is operable to selectively apply a suitable activation signal for the active material, which results in a change in modulus properties. The activation signal provided by the activation device may include a heat signal, a magnetic signal, an electrical signal, and the like, and combinations comprising at least one of the foregoing signals, with the particular activation signal dependent on the materials and/or configuration of the active material. For example, a magnetic and/or an electrical signal may be applied for changing the property of the active material fabricated from magnetostrictive materials. A heat signal may be applied for changing the property of the active material fabricated from shape memory alloys and/or shape memory polymers. An electrical signal may be applied for changing the property of the active material fabricated from electroactive materials, electrostatics, and/or ionic polymer metal composite materials. Programming of the activation device to selectively provide the activation signal to the active material can be made with a suitable controller, the programming of which is well within the skill of those in the art.

Desirably, the change in the modulus property of the active material remains for the duration of the applied activation signal. Also desirably, upon discontinuation of the activation signal, the property reverts substantially to its original state prior to the change.

Shape memory polymers (SMPs) generally refer to a group of polymeric materials that demonstrate the ability to return to some previously defined shape when subjected to an appropriate thermal stimulus. Shape memory polymers may be thermoresponsive (i.e., the change in the property is caused by a thermal activation signal), photoresponsive (i.e., the change in the property is caused by a light-based activation signal), moisture-responsive (i.e., the change in the property is caused by a liquid activation signal such as humidity, water vapor, or water), or a combination comprising at least one of the foregoing.

Generally, SMPs are phase segregated co-polymers comprising at least two different units, which may be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment may be crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SNPs comprising (n) segments, the SMP is said to have a hard segment and (n–1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it may be possible to demonstrate multiple permanent shapes. Similarly using a layered or composite approach, a combination of multiple SMPs will demonstrate transitions between multiple temporary and permanent shapes.

For SMPs with only two segments, the temporary shape of the shape memory polymer is set at the first transition temperature, followed by cooling of the SMP, while under load, to lock in the temporary shape. The temporary shape is maintained as long as the SMP remains below the first transition temperature. The permanent shape is regained when the SMP is once again brought above the first transition temperature with the load removed. Repeating the heating, shaping, and cooling steps can repeatedly reset the temporary shape.

Most SMPs exhibit a "one-way" effect, wherein the SMP exhibits one permanent shape. Upon heating the shape memory polymer above a soft segment thermal transition temperature without a stress or load, the permanent shape is achieved and the shape will not revert back to the temporary shape without the use of outside forces.

As an alternative, some shape memory polymer compositions can be prepared to exhibit a "two-way" effect, wherein the SMP exhibits two permanent shapes. These systems include at least two polymer components. For example, one component could be a first cross-linked polymer while the other component is a different cross-linked polymer. The components are combined by layer techniques, or are interpenetrating networks, wherein the two polymer components are cross-linked but not to each other. By changing the temperature, the shape memory polymer changes its shape in the direction of a first permanent shape or a second permanent shape. Each of the permanent shapes belongs to one component of the SMP. The temperature dependence of the overall shape is caused by the fact that the mechanical properties of one component ("component A") are almost independent of the temperature in the temperature interval of interest. The mechanical properties of the other component ("component B") are temperature dependent in the temperature interval of interest. In one embodiment, component B becomes stronger at low temperatures compared to component A, while component A is stronger at high temperatures and determines the actual shape. A two-way memory device can be prepared by setting the permanent shape of component A ("first permanent shape"), deforming the device into the permanent shape of component B ("second permanent shape"), and fixing the permanent shape of component B while applying a stress.

It should be recognized by one of ordinary skill in the art that it is possible to configure SMPs in many different forms and shapes. Engineering the composition and structure of the polymer itself can allow for the choice of a particular temperature for a desired application. For example, depending on the particular application, the last transition temperature may be about 0° C. to about 300° C. or above. A temperature for shape recovery (i.e., a soft segment thermal transition temperature) may be greater than or equal to about –30° C. Another temperature for shape recovery may be greater than or equal to about 40° C. Another temperature for shape recovery may be greater than or equal to about 100° C. Another temperature for shape recovery may be less than or equal to about 250° C. Yet another temperature for shape recovery may be less than or equal to about 200° C. Finally, another temperature for shape recovery may be less than or equal to about 150° C.

Optionally, the SMP can be selected to provide stress-induced yielding, which may be used directly (i.e. without heating the SMP above its thermal transition temperature to 'soften' it) to make the panel conform to a given surface as may be desired for different applications. The maximum strain that the SMP can withstand in this case can, in some embodiments, be comparable to the case when the SMP is deformed above its thermal transition temperature.

Although reference has been, and will further be, made to thermoresponsive SMPs, those skilled in the art in view of this disclosure will recognize that photoresponsive, moisture-responsive SMPs and SMPs activated by other methods may readily be used in addition to or substituted in place of thermoresponsive SMPs. For example, instead of using heat, a temporary shape may be set in a photoresponsive SMP by irradiating the photoresponsive SMP with light of a specific wavelength (while under load) effective to form specific crosslinks and then discontinuing the irradiation while still under load. To return to the original shape, the photoresponsive SMP may be irradiated with light of the same or a different specific wavelength (with the load removed) effective to cleave the specific crosslinks. Similarly, a temporary shape can be set in a moisture-responsive SMP by exposing specific functional groups or moieties to moisture (e.g., humidity, water, water vapor, or the like) effective to absorb a specific amount of moisture, applying a load or stress to the moisture-responsive SMP, and then removing the specific amount of moisture while still under load. To return to the original shape, the moisture-responsive SMP may be exposed to moisture (with the load removed).

Suitable shape memory polymers, regardless of the particular type of SMP, can be thermoplastics, thermosets-thermoplastic copolymers, interpenetrating networks, semi-interpenetrating networks, or mixed networks. The SMP "units" or "segments" can be a single polymer or a blend of polymers. The polymers can be linear or branched elastomers with side chains or dendritic structural elements. Suitable polymer components to form a shape memory polymer include, but are not limited to, polyphosphazenes, poly(vinyl alcohols), polyamides, polyimides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), poly(ethylene vinyl acetate), polyethylene, poly(ethylene oxide)-poly(ethylene terephthalate), polyethylene/nylon (graft copolymer), polycaprolactones-polyamide (block copolymer), poly(caprolactone) dimethacrylate-n-butyl acrylate, poly(norbornyl-polyhedral oligomeric silsequioxane), polyvinylchloride, urethane/butadiene copolymers, polyurethane-containing block copolymers, styrene-butadiene block copolymers, and the like. The polymer(s) used to form the various segments in the SMPs described above are either commercially available or can be synthesized using routine chemistry. Those of skill in the art can readily prepare the polymers using known chemistry and processing techniques without undue experimentation.

As will be appreciated by those skilled in the art, conducting polymerization of different segments using a blowing agent can form a shape memory polymer foam, for example, as may be desired for some applications. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N' dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen, and the like.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). It should be noted that the above-mentioned transition temperatures are functions of the stress experienced by the SMA sample. Specifically, these temperatures increase with increasing stress. In view of the foregoing properties, deformation of the shape memory alloy is preferably at or below the austenite transition temperature (at or below $A_s$). Subsequent heating above the austenite transition temperature causes the deformed shape memory material sample to revert back to its permanent shape. Thus, a suitable activation signal for use with shape memory alloys is a thermal activation signal having a magnitude that is sufficient to cause transformations between the martensite and austenite phases.

The temperature at which the shape memory alloy remembers its high temperature form when heated can be adjusted by slight changes in the composition of the alloy and through thermo-mechanical processing. In nickel-titanium shape memory alloys, for example, it can be changed from above about 100° C. to below about –100° C. The shape recovery process can occur over a range of just a few degrees or exhibit a more gradual recovery. The start or finish of the transformation can be controlled to within a degree or two depending on the desired application and alloy composition. The mechanical properties of the shape memory alloy vary greatly over the temperature range spanning their transformation, typically providing shape memory effect, superelastic effect, and high damping capacity. For example, in the martensite phase a lower elastic modulus than in the austenite phase is observed. Shape memory alloys in the martensite phase can undergo large deformations by realigning the crystal structure arrangement with the applied stress, e.g., retraction of the panel into a stowed configuration. As will be described in greater detail below, the material will retain this shape after the stress is removed.

Suitable shape memory alloy materials for use in the panel include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends on the temperature range where the component will operate.

Aside from strict shape recovery, any active material that can be made to linearly expand or contract may be used to produce a bending actuator by combining this active material with a non-active elastic member. In the literature, this is generally referred to as a unimorph actuator. If both components are made of the same material but made to deform in opposite directions, the material becomes a bimorph. For on demand applications, some materials may be appropriate themselves for the outer surface of the vehicle control mechanism.

Bending to the left or right can be induced by using the at least one active material that expands or contracts, respectively. In the bimorph either direction can also be achieved depending on orientation of the at least one active material layers. An unimorph may be created by using a shape memory alloy, conducting polymer, electrostrictive polymer, or other axially straining material, along with an elastic component that causes bending couple to be created. The elastic member can belong to many material classes including metallic alloys, polymers, and ceramics. Preferred materials are those which exhibit large elastic strain limits, and those which can efficiently store mechanical energy. Secondary considerations include those which may be easily bonded to the at least one active material, have properties that are acceptable in the working temperature range, and have adequate toughness to survive repeated actuation. A bimorph may be created for any material in which the material may be driven into both extension and compression depending on the driving signal. Ionic polymer actuators such as IPMC and conducting polymers intrinsically exhibit this effect due to the transport of ionic species that cause swelling across a membrane. Therefore, these materials are preferably used for this type of deformation.

Electroactive polymers include those polymeric materials that exhibit piezoelectric, pyroelectric, or electrostrictive properties in response to electrical or mechanical fields. An example:of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly(poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Suitable magnetorheological fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, more preferably, reduced carbonyl iron.

The particle size should be selected so that the particles exhibit multi-domain characteristics when subjected to a magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Among the active materials noted above, shape memory alloys, magnetic shape memory alloys, electroactive polymers, and magnetorheological elastomers, can develop a measurable blocking force upon application of the appropriate activation signal, and advantageously provide the additional functionality of a self folding structure. In contrast, shape memory polymers, baroplastics, and magnetorheological and electrorheological fluids provide no significant actuating force. As such, these types of active materials enable fold lines within the panel that can be locked in at any relative angle, thereby locking in internal stresses that would otherwise act to reconfigure the panel. Shape memory polymers and baroplastics can also serve to lock the fold lines when not activated, whereas magnetorheological and electrorheological fluids generally provide locking when the fold lines are actuated (though the reverse would occur for magnetorheological fluid in the presence of a permanent magnet).

In short, active materials and composites thereof, whose stiffness can be changed by the application of a suitable stimulus, can be used to design actuable and/or tunable stiffness hinge lines for foldable panels. An example of such an active material based panel hinge line is described below and shown in FIGS. 1 and 2.

FIGS. 1 and 2 illustrate an exemplary reconfigurable panel 10 in accordance with the present disclosure. The application for which the panel is to be used is not intended to be limited. For automotive applications as shown more clearly in FIG. 3, the panel can be form, in whole or in part, a convertible roof panel 52 for a vehicle 50; the flooring material 54 or a luggage compartment 56, a vehicle trunk 58 or the like; the panels covering a vehicle sunroof 60; hinges for the glove box 62, map, center console storage area 64, storage bin doors 66; visors 68, fuel filler doors 70; and the like. Other applications include its use in umbrellas, roofs and panels for temporary shelters, retractable awnings, tents, folding tables, and the like. The reconfiguration times and additional components for operating and controlling actuation can be tailored to the specific application and embodiment. Advantageously, the reconfigurable panels can eliminate the need for reinforcement seams and/or seals between panel sections.

In the embodiment shown, the panel 10 includes alternating rigid segments 12 and active material based segments 14. The active material based segments can be formed in part or in whole of the active material. In this manner, the panel can be self-folding by selecting a suitable active material that provides an actuating force. By way of example, the active material based segments 14 can be formed of a shape memory polymer 16 with elements 18 formed of a shape memory alloy, which are used to connect the active material based segment 14 to the adjacent rigid segment 12. The elements can take the form of wires, bands, springs, or the like and are not intended to be limited to any particular form or shape. Optionally, one of the elements can be formed of spring steel. The non-active material elements are in hereinafter referred to as energy storage elements. Selective actuation of the shape memory alloy elements allows distributed actuation for an articulated panel without the need for numerous electric motors. Although reference has been made to wires, it should be noted that other forms of the shape memory alloy could be used, e.g., strips, bands, springs, and the like. For automotive convertible roof applications, the relative rigidity of the flexible active material based segments 14 after the panel has been unfolded (FIG. 1) permits rigidity that is approximately intermediate to current hard top designs and fabric covered retractable roofs. The rigidity of the shape memory polymer 16 when the panel is retracted, e.g., roof is retracted (FIG. 2), allows a power-off hold that enables the roof to be stowed as a single body. The shape memory polymer surfaces may be treated for environmental resistance or may be encapsulated in a weather resistant coating.

Optionally, the panels 10 can be comprised completely of shape memory polymer 16 (without alternating segments of rigid material) and can be used instead of fabric in a soft-top convertible. As such, the convertible roof would have a roof stiffness that is intermediate to hard and soft tops. Such a design can optionally have embedded shape memory material (e.g., shape memory alloys) actuation for deployment, wherein a motor near the trunk, for example, can retract and roll the panel while the shape memory polymer is activated and soft for compact stowage.

In another embodiment, the reconfigurable panel is comprised of a woven fabric, wherein some strands of the warp and/or weft are strands formed of a shape memory material such as a shape memory polymer and/or shape memory alloy to provide a convertible roof with a stiffness that is fully adjustable between that of hard tops and soft tops. For example, the shape memory polymer elements would be used to control stiffness, wherein the shape memory alloy strands/wires, if present, can be used to variously control stiffness, morph the geometry of, or actuate/fold/retract the panel.

Other embodiments would employ an electroactive polymer. For example, the electroactive polymer can be used in sheet form instead of the shape memory alloy wire to provide actuation means. Still other embodiments employ magnetorheological and electrorheological fluids in, for example, tubes or tube segments at the fold lines to function as activatable hinges. Note that both power off and power on versions are available of the magnetorheological hinge, a permanent magnetic allowing power off to hold/lock shape, power on in an electromagnet suitably oriented to cancel the field of the permanent magnet to allow hinge rotation.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A foldable panel, comprising:
   alternating segments of a rigid non-active material and an active material, wherein the alternating segments define hinges at about a region of the active material, wherein the alternating segments of the rigid non-active material and the active material define at least one of a convertible roof, a floor or a cover of a luggage compartment, a fuel filler door, a sun visor, a glove box door, and a storage bin door;
   an activation device in operative communication with the active material, wherein the activation device is adapted to provide an activation signal, wherein the shape and/or modulus properties of the active material change in response to the activation signal; and
   a controller in operative communication with the activation device.

2. The foldable panel of claim 1, wherein the active material segment comprises a shape memory polymer, a shape memory alloy, a ferromagnetic shape memory alloy, an electroactive polymer, a magnetorheological elastomer, a magnetorheological fluid, an electrorheological elastomer, an electrorheological fluid, and combinations thereof.

3. The foldable panel of claim 1, wherein the active material segment is selected to be self-actuatable upon actuation with the activation device.

4. The foldable panel of claim 1, wherein the active material segment is selected to provide no actuation force upon actuation.

5. The foldable panel of claim 1, wherein the active material segment is effective to lock or unlock a fold in the panel.

6. The foldable panel of claim 1, wherein the active material segment comprises a shape memory polymer body and at least one shape memory alloy element.

7. The foldable panel of claim 1, wherein the active material segment comprises a rotatable tube filled with a selected one of a magnetorheological fluid and an electrorheological fluid.

8. The foldable panel of claim 1, further comprising an energy storage element.

9. A panel, comprising:

a segment of shape memory polymer, wherein the segments of the shape memory polymer define at least one of a convertable roof, a floor or cover of a luggage compartment, a fuel filler door, a sun visor, a glove box door, and a storage bin door;

an activation device in operative communication with the shape memory polymer, wherein the activation device is adapted to provide an activation signal to the shape memory polymer and selectively change a modulus property of the shape memory polymer, wherein the change in the modulus property increases flexibility of the segment.

10. The panel of claim 9, further comprising an energy storage element.

11. The panel of claim 10, wherein the shape memory polymer forms at least a portion of a fabric, wherein the change in modulus property changes a modulus property of the panel.

12. The panel of claim 10, wherein the activation signal is a thermal activation signal.

13. A method for selectively folding or unfolding a panel, the method comprising:

activating an active material defining at least a portion of the panel, wherein the panel defines at least one of a convertable roof, a floor or cover of a luggage compartment, a fuel filler door, a sun visor, a glove box door, and a storage bin door; wherein activating the active material changes a modulus property of the active material;

folding or unfolding the panel at hinge points defined by a location of the active material; and deactivating the active material to restore the modulus property of the active material.

14. The method of claim 13, wherein the panel comprises alternating segments of the active material and a rigid non-active material.

15. The method of claim 13, wherein folding or unfolding the panel at the hinge points is self-actuated by the active material.

16. The method of claim 13, wherein the active material comprises a shape memory polymer, a shape memory alloy, a ferromagnetic shape memory alloy, an electroactive polymer, a magnetorheological elastomer, a magnetorheological fluid, an electrorheological elastomer, an electrorheological fluid, and combinations thereof.

* * * * *